C. S. HIRST, DEC'D.
C. I. CRONIN AND LOGAN TRUST COMPANY, EXECUTORS.
CULINARY UTENSIL.
APPLICATION FILED MAR. 6, 1919.
1,350,651.
Patented Aug. 24, 1920.
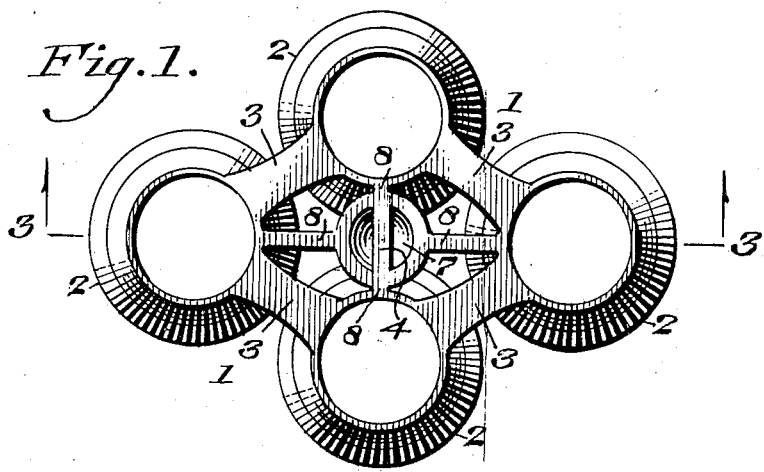
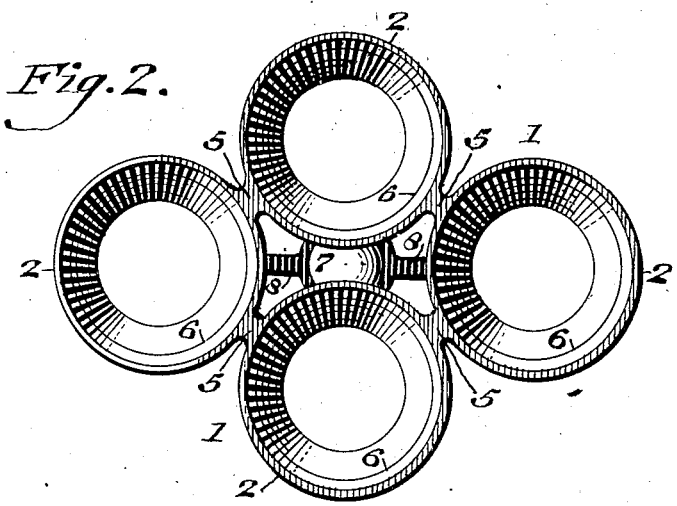
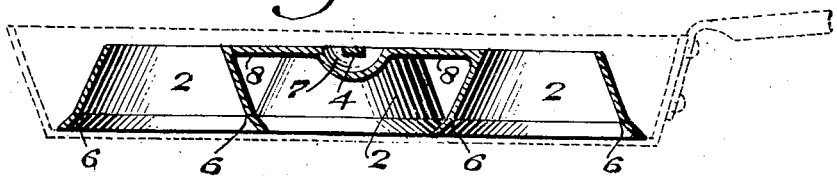
INVENTOR
Charles S. Hirst
BY Diedersheim + Fairbanks
ATTORNEYS

UNITED STATES PATENT OFFICE.

CHARLES S. HIRST, OF PHILADELPHIA, PENNSYLVANIA; CHARLES I. CRONIN AND LOGAN TRUST COMPANY EXECUTORS OF SAID CHARLES S. HIRST, DECEASED.

CULINARY UTENSIL.

1,350,651.   Specification of Letters Patent.   Patented Aug. 24, 1920.

Application filed March 6, 1919. Serial No. 281,047.

*To all whom it may concern:*

Be it known that I, CHARLES S. HIRST, a citizen of the United States, residing in the city and county of Philadelphia, State of Pennsylvania, have invented a new and useful Culinary Utensil, of which the following is a specification.

My invention consists of a culinary utensil more particularly designed for poaching and frying eggs, forming fritters, doughnuts, crullers, and other articles of food, the same embodying a hollow body adapted to be placed in a skillet or frying pan, it being open at the bottom and having its inner wall adapted to impart an attractive shape to the articles of food, and limit its diameter and thickness, as will be hereinafter described.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a top plan view of a culinary utensil embodying my invention.

Fig. 2 represents a bottom plan view thereof.

Fig. 3 represents a transverse section thereof on line 3—3 Fig. 1.

Similar numerals of reference indicate corresponding parts in the figures.

Referring to the drawings.

1 designates the body of the utensil, the same consisting of a series of cups or ring-like bodies 2 which are open throughout and united at the top by the radial arms 3 which extend from cup to cup and join the cups at the sides thereof. At the center of the body is the handle 4 for carrying and manipulating purposes, as will be hereafter further explained.

The cups are united at the bottom by the arms 5 which extend from one cup to the other and join the same at the sides thereof, thus forming a strong structure which is able to endure the harsh usage to which it may be subjected in a kitchen, especially as the body may be placed roughly in a skillet or frying pan and similarly removed therefrom.

In practice the cups and the connecting members will be formed of cast metal of integral construction so as to possess strength for its service and be of sufficient weight as to lie properly on the bottom of the skillet or frying pan and so be prevented from rising while the article of food is being fried, poached, or otherwise cooked.

The inner walls of the cups 2 are of conical form, they increasing in diameter near the lower ends of the cups, the said ends being offset forming the inturned shoulders 6, it being seen in Fig. 3 that the utensil is placed on the bottom of a skillet, a frying or stew pan, or the like, and in the case of preparing an egg the yolk and white thereof are dropped into a cup so as to be subjected to the action of the grease or water in the skillet or pan, and thus poached or fried as the case may be, it being seen that owing to the side overhanging bottom portion of the inner wall the egg material may spread to the extent of said portion and so assume a uniform circumference while at the same time the shoulder 6 renders the circumference compact and prevents the swelling upwardly of the same, whereby the poached or fried egg will be of substantial uniform thickness and present a comparatively flat, appetizing and attractive shape throughout.

When the utensil is raised the wide bottom of the cup readily slips off of the egg-product leaving the latter remaining in the skillet or pan from whence it can be removed by a suitable implement usual in kitchens.

The utensil may be lowered into the skillet or frying pan and lifted therefrom by a raised cross bar forming the handle 4 which is secured to the top of the depressed member 7 which is connected with the adjacent portions of the cups 2 by the additional arms 8 and so supported, said depressed member 7 also strengthening the central portion of the body of the utensil, it being connected with the arms 8 and consequently with the upper portions of the cups. This allows a fork or other implement or a finger to be passed under the handle 4 to engage the latter, the depression of the member 7 adapting said implement or finger to enter the space of said depression, while the handle is flush or comparatively flush with the top edges of the cups so as to be prevented from projecting above said edges by which provision the utensils may be placed flat one above the other for the purpose of packing, storing and transportation. As said cross bar 4 is connected with the bodies 2 on the inner sides thereof they serve to strengthen the utensil at the center thereof and prevent spreading of the bodies thereat.

In practice the cups with the appurtenances stated may be made integral of cast metal for the purpose of strength, lightness and inexpensiveness, but of course, they may be made of sheet metal and united by solder, rivets, etc., without affecting the utility of the device.

Having thus described my invention what I claim as new and desire to secure by Letters Patent is:—

1. In a culinary utensil of the character stated, a series of connected inverted conical cups which are open throughout and interiorly of conical form, and a member centrally joining the upper portions of said cups, said member having therein a depression, and a handle joined to the wall of said member above said depression.

2. A culinary utensil of the character stated consisting of a series of cups which are open throughout and interiorly of conical form, a series of arms joining the upper portions of said cups, and a series of arms joining the lower portions of said cups, the widest diameters of the interiors of said cups being below, the lower ends of said cups being interiorly offset forming inturned shoulders thereat.

3. In a culinary utensil of the character stated, a unitary device consisting of a series of cups which are open throughout and interiorly of conical form, a series of arms joining the upper portions of said cups, and a series of arms joining the lower portions of said cups, the widest diameters of the interiors of said cups being below, a depressed member at the top, and a cross handle in said member joining the inner wall thereof.

CHARLES S. HIRST.

Witnesses:
JOHN A. WIEDERSHEIM,
N. BUSSINGER.